United States Patent [19]

Calnan

[11] 4,372,513
[45] Feb. 8, 1983

[54] SUPPORT COUPLING FOR OUTDOOR ELECTRICAL JUNCTION BOX

[76] Inventor: Thomas P. Calnan, 4200 NE. 3rd Ave., Pompano Beach, Fla. 33064

[21] Appl. No.: 177,223

[22] Filed: Aug. 11, 1980

[51] Int. Cl.³ .............................................. A47G 23/02
[52] U.S. Cl. ................................ 248/146; 248/DIG. 6
[58] Field of Search ......................... 248/146, DIG. 6; 220/3.2, 3.3, 3.9; 174/58, 63

[56] References Cited

U.S. PATENT DOCUMENTS

| | | | |
|---|---|---|---|
| 1,133,535 | 3/1915 | Cain et al. | 174/63 |
| 1,171,751 | 2/1916 | Sands | 174/63 |
| 1,734,893 | 11/1929 | Carlson | 174/63 |
| 2,271,504 | 1/1942 | Kees et al. | 174/63 |
| 2,314,408 | 3/1943 | Knight | 220/3.9 |

Primary Examiner—J. Franklin Foss
Attorney, Agent, or Firm—Eugene F. Malin

[57] ABSTRACT

A device for adjustably supporting and stabilizing an outdoor electrical junction box comprising a rigid support shaft mounted vertically at one end in the ground, an electrical junction box having a back face knockout that when removed leaves an aperture of a predetermined diameter, and a junction box support shaft coupling member having a threaded fastener that fits securely into the knockout aperture for securely attaching the coupling member to the junction box, a central passage for receiving the support shaft and a set screw for locking the coupling member relative to the support shaft.

3 Claims, 4 Drawing Figures

SUPPORT COUPLING FOR OUTDOOR ELECTRICAL JUNCTION BOX

BACKGROUND OF THE INVENTION

This invention relates to a stable, vertical support for an electrical junction box and more particularly to a support coupling slidably mounted to a support shaft and connected to a junction box which allows the junction box to be adjusted to any vertical position along the support shaft relative to the ground.

In the past, there have been various devices for supporting outlet boxes. By way of example is U.S. Pat. No. 1,734,893 in which a means for adjustably supporting outlet boxes is illustrated. This invention teaches a horizontally adjustable outlet box which has a support bar connected between two adjacent studs.

Another example is U.S. Pat. No. 2,271,504 in which an outlet box hanger is illustrated. However the hanger portion of the invention must be attached to a joist in order that the outlet box can be hung therefrom. The stud 13 also is slidable in a horizontal direction and has no means for locking the stud in a desired position.

The present invention overcomes the limitations of the prior devices by providing a junction box-support coupling member, support shaft and junction box for outdoor use. The support shaft can be driven into the ground to the necessary depth to rigidly support the shaft and box. The box can then be adjusted to the desired position above the ground. Support joists or studs are not required in order to support the junction box.

SUMMARY OF THE INVENTION

A junction box support shaft coupling member in combination with a support shaft and outdoor electrical junction box is provided. The junction box-support shaft coupling member comprises a cylindrical body having a threaded fastener that juts securely into the knockout aperture for securely attaching the coupling member to the junction box and a central passageway disposed therethrough for sliding engagement with the support shaft, and a set screw for maintaining the junction box-support shaft coupling member in a predetermined position along the support shaft.

The outdoor electrical junction box generally has along its back face at least one knockout which when removed forms an aperture in the box. The preferred knockout is selected and removed and then the threaded end of the support coupling is fitted through the knockout aperture until the junction box comes in contact with the cylindrical body. A nut acts as a stop for the cylindrical body. The threaded end of the support coupling protrudes about one thread thickness into the box. The tread diameter can be sized as desired (conventionally ½ inch or ¾ inch). This keeps the junction box in clamping relation to the cylindrical body.

Once a site is selected for installation of the junction box, a support shaft can be driven into the ground at that point or held in place by any other surface support means. Once the support shaft is in position, the central passageway of the coupling member is slidingly engaged with the support shaft. The desired height of the junction box is then selected and the coupling member locked into that position by the set screw.

Electrical conduit can then be connected to the junction box at any of the other knockout positions provided for.

It is therefore an object of this invention to provide an adjustable coupling member especially designed for outdoor installation of electrical junction boxes.

It is another object of this invention to provide a means for supporting an electrical junction box independent of any housing structure or the like.

In accordance with these and other objects which will be apparent hereinafter, the instant invention will now be described with particular reference to the accompanying drawings.

DESCRIPTION OF THE PREFERRED EMBODIMENT

Figure 1:
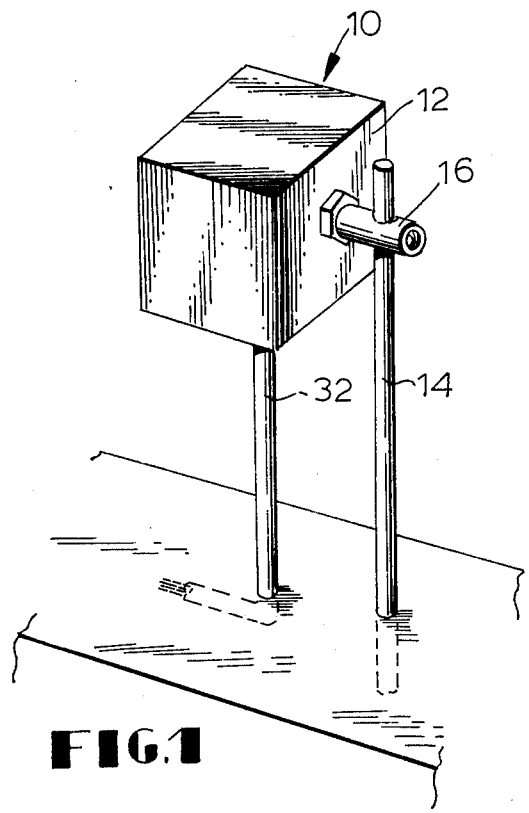
FIG. 1 is a perspective view of the invention installed.

Referring to FIG. 1, the invention is shown generally at 10. The invention comprises a support shaft 14, a junction box-support coupling member 16, and an electrical junction box 12. To install the junction box 12, the support shaft 14 is driven into the ground, embedded in a concrete base or any other support structure such that it assumes a vertically oriented position.

Figure 3:
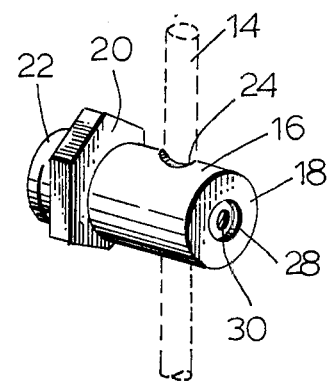
FIG. 3 is a perspective view of the coupling member.
Figure 4:
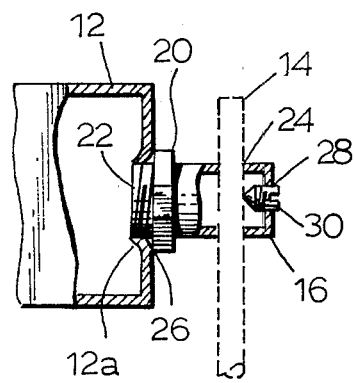
FIG. 4 is a partial cross-sectional view of the coupling member taken across the line 4 and looking in the direction of the arrows.

The coupling member 16 is connected to the junction box 12. As shown in FIGS. 3 and 4, the coupling member 16 has a hollow, cylindrical body with a threaded end 22 and a closed end 18. The closed end 18 has a threaded aperture 28 drilled therethrough and a set screw 30 screwed into the threaded aperture 28. Before the coupling member 16 is joined to the electrical junction box 12, a threaded nut 20 is screwed onto the threaded end 22 of the support coupling 16 such that the support coupling does not pass all the way through the opening 26 of the junction box 12. The coupling member 16 also has a central passageway 24 so that the coupling member 16 can be slidingly engaged with the support shaft 14.

Figure 2:
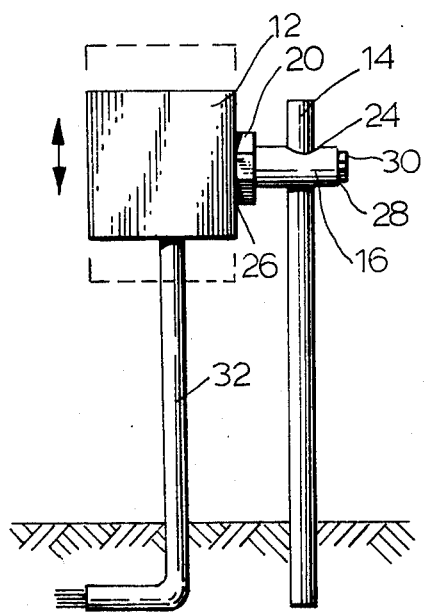
FIG. 2 is a side view of the invention.

In the preferred method of installation, the coupling member 16 is first connected to the back of the junction box 12 such that the threaded end 22 passes through the opening 26 into the inside of the junction box 12a until the junction box 12 comes in contact with the threaded nut 20. The coupling member 16 is then slidingly engaged with the support shaft 14 via the central passageway 24 to the desired position along the support shaft 14 as shown in FIG. 2. The set screw 30 is then tightened against the support shaft 14 to hold the junction box 12 and coupling member 16 in the desired position. Other means may be utilized to lock the coupling member 16 and junction box 12 in the desired position.

The junction box 12, is generally adjusted to a height such that an electrical conduit 32 can be joined therewith through another knockout aperture.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In combination with an existing outdoor electrical junction box supported above the ground and having at least one knockout opening and an easily connectable support shaft driven into the ground adjacent said outdoor electrical junction box, and a coupling member comprising:

a body, said body having a threaded end means for securing said body to said knockout opening of said junction box;

a central passageway means disposed thransversely through said body, said passageway means sized for sliding engagement with said support shaft to support said outdoor electrical junction box above the ground;

retaining means for maintaining said coupling member in a predetermined non-slidable position along said support shaft;

said threaded end means sized for threadably mating with said opening in said outdoor electrical junction box for securing said coupling member to said outdoor electrical junction box;

nut means for locking said outdoor electrical junction box and said coupling member in a particular position by external movement of said nut means, said nut means screwed onto said threaded end means before said threaded end is mated with said outdoor electrical junction box.

2. A support coupling as set forth in claim 1, wherein:

said opening is in a vertical wall of said outdoor electrical junction box;

said retaining means is a threaded set screw passageway disposed through said body and a set screw therein, said set screw tightened against said support shaft, and said particular position is a generally horizontal position.

3. A support coupling as set forth in claim 1, wherein: said body is hollow and cylindrical.

* * * * *